US008608475B2

(12) United States Patent
Roy et al.

(10) Patent No.: US 8,608,475 B2
(45) Date of Patent: *Dec. 17, 2013

(54) MOTION SIMULATOR AND METHOD

(75) Inventors: Philippe Roy, St-Bruno (CA); Michel Bérubé, Contrecoeur (CA)

(73) Assignee: D-Box Technologies Inc., Longueuil (CA)

( * ) Notice: Subject to any disclaimer, the term of this patent is extended or adjusted under 35 U.S.C. 154(b) by 1351 days.

This patent is subject to a terminal disclaimer.

(21) Appl. No.: 10/844,460

(22) Filed: May 13, 2004

(65) Prior Publication Data

US 2004/0229192 A1 Nov. 18, 2004

Related U.S. Application Data

(60) Provisional application No. 60/469,824, filed on May 13, 2003.

(51) Int. Cl.
*G09B 9/02* (2006.01)

(52) U.S. Cl.
USPC .................... 434/29; 434/58; 434/59; 434/67

(58) Field of Classification Search
USPC .......................................... 434/29, 58, 59, 67
See application file for complete search history.

(56) References Cited

U.S. PATENT DOCUMENTS

| | | | |
|---|---|---|---|
| 4,312,044 A * | 1/1982 | Baba ............................. | 702/106 |
| 4,461,470 A | 7/1984 | Astroth et al. | |
| 4,498,656 A | 2/1985 | Arild | |
| 4,753,596 A * | 6/1988 | Hart et al. ........................ | 434/29 |
| 4,807,841 A | 2/1989 | Edstrom | |
| 4,934,723 A * | 6/1990 | Dysarz ........................ | 280/250.1 |
| 5,054,771 A | 10/1991 | Mansfield | |
| 5,056,864 A * | 10/1991 | Cooper .................... | 297/188.21 |
| 5,195,746 A | 3/1993 | Boyd et al. | |
| 5,290,034 A | 3/1994 | Hineman | |
| 5,409,295 A | 4/1995 | Edstrom | |
| 5,419,613 A | 5/1995 | Wedeking | |

(Continued)

FOREIGN PATENT DOCUMENTS

JP        11-179051        7/1999

OTHER PUBLICATIONS

BattleChair™, as described on Internet website www.battlechair.com.

(Continued)

*Primary Examiner* — Robert J Utama
(74) *Attorney, Agent, or Firm* — Norton Rose Fulbright Canada LLP

(57) ABSTRACT

A motion simulator for transmitting motion with respect to a floor as a function of motion signals associated to a video output. The motion simulator comprises a seating portion for accommodating a viewer viewing the video output. Actuators each have a housing and an output shaft interrelated by a degree of freedom. Each of the actuators has a motor connected to the seating portion for displacing the housing with respect to the output shaft along the degree of freedom as a function of actuation from the actuators in relation to the motion signals. The housing of each of the actuators is secured to the seating portion. The output shaft of each of the actuators comprises a leg supporting the motion simulator on the floor, whereby the seating portion is movable as a function of actuation from the actuators.

9 Claims, 7 Drawing Sheets

(56) References Cited

U.S. PATENT DOCUMENTS

| | | | |
|---|---|---|---|
| 5,954,508 A | * | 9/1999 | Lo et al. .......................... 434/55 |
| 6,089,663 A | | 7/2000 | Hill |
| 2001/0036868 A1 | * | 11/2001 | Roy et al. ...................... 472/130 |
| 2002/0115043 A1 | | 8/2002 | Baker et al. |
| 2005/0069839 A1 | * | 3/2005 | Denne ............................. 434/29 |

OTHER PUBLICATIONS

Intensor LX350 Gaming Chair™, as described on Internet website www.3dsoundsurge.com/reviews/Intensor3501x/intensor3501x.html.

* cited by examiner

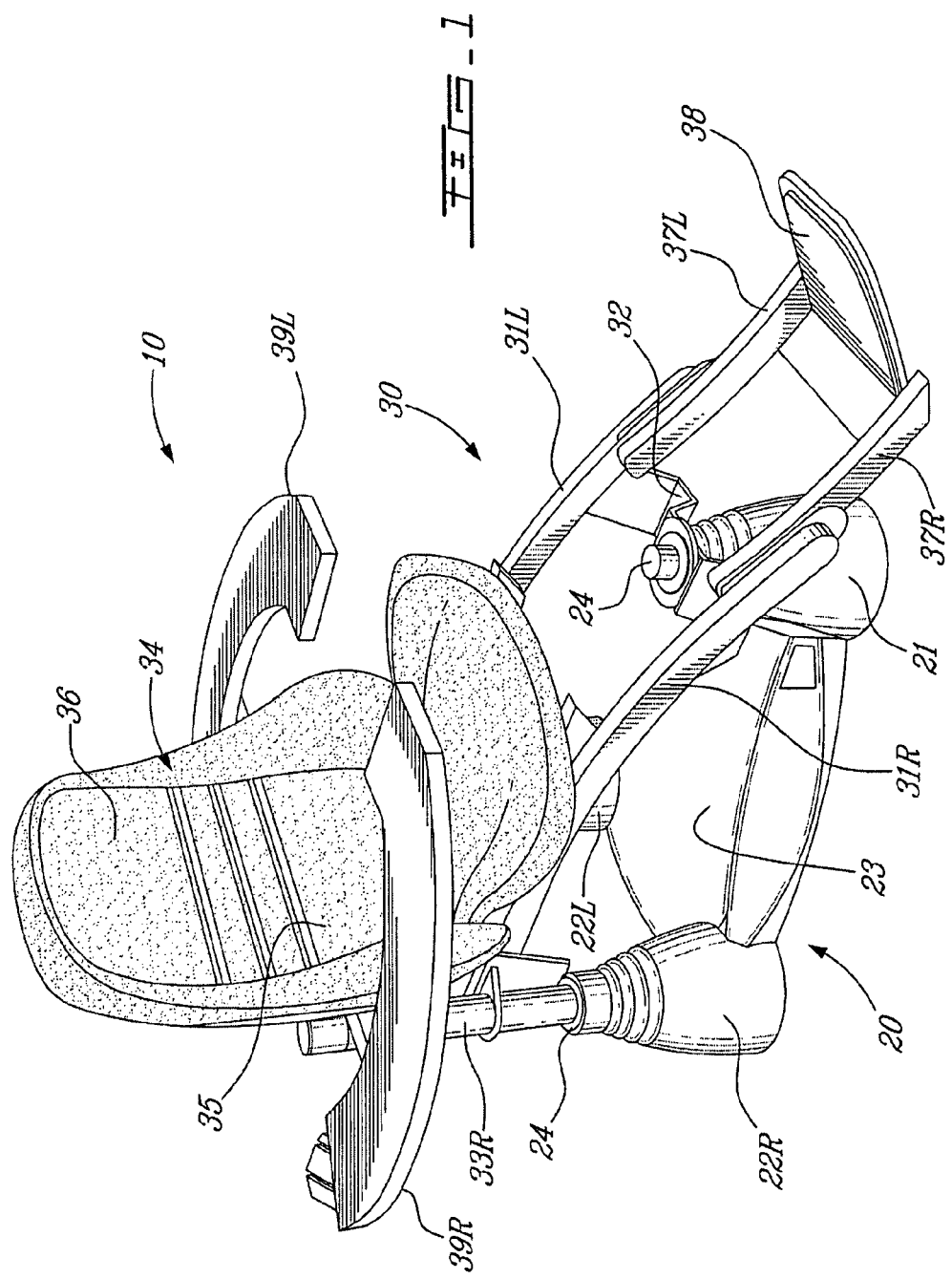

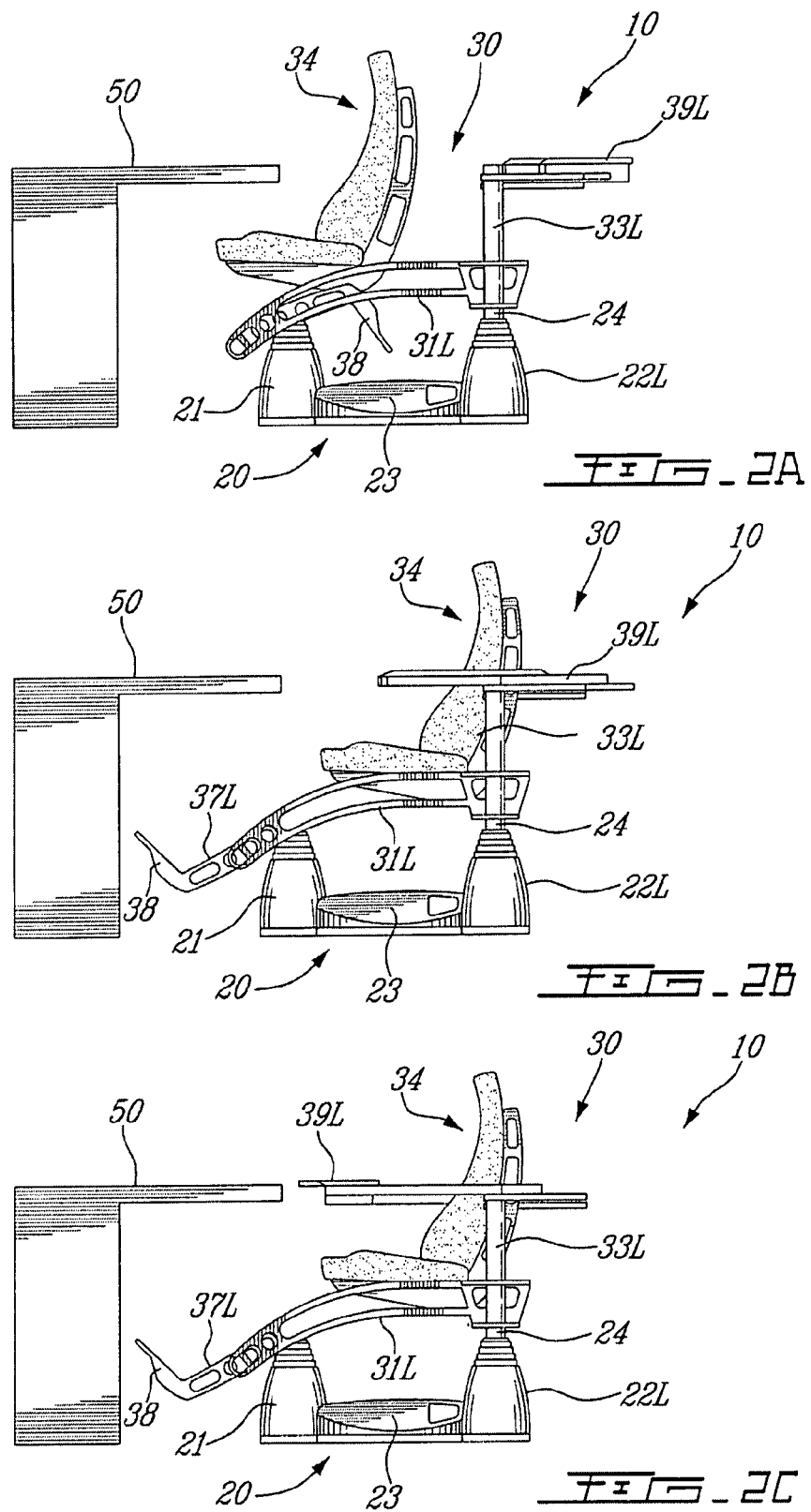

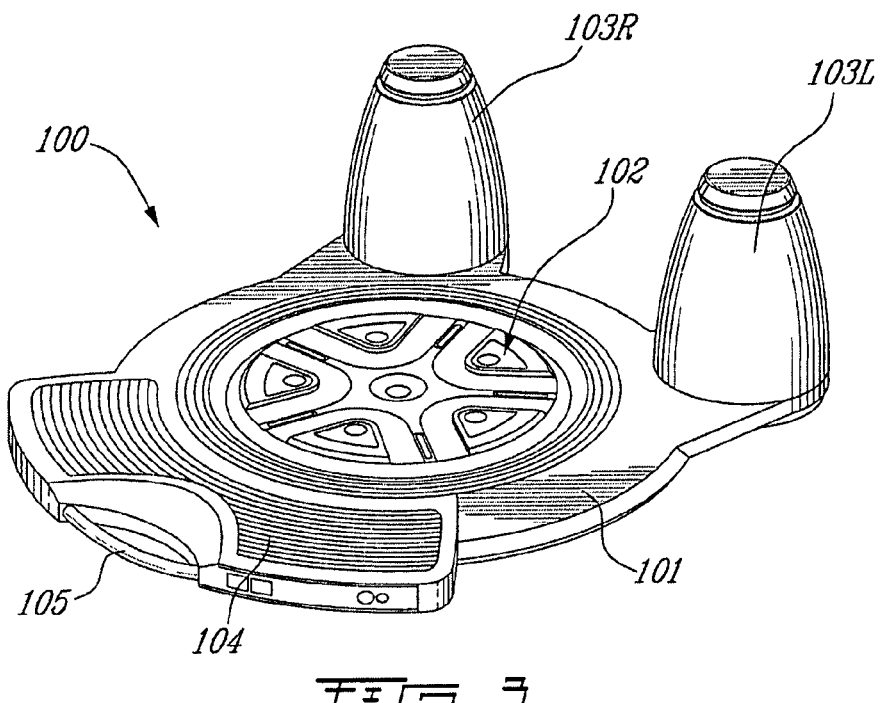
FIG_3
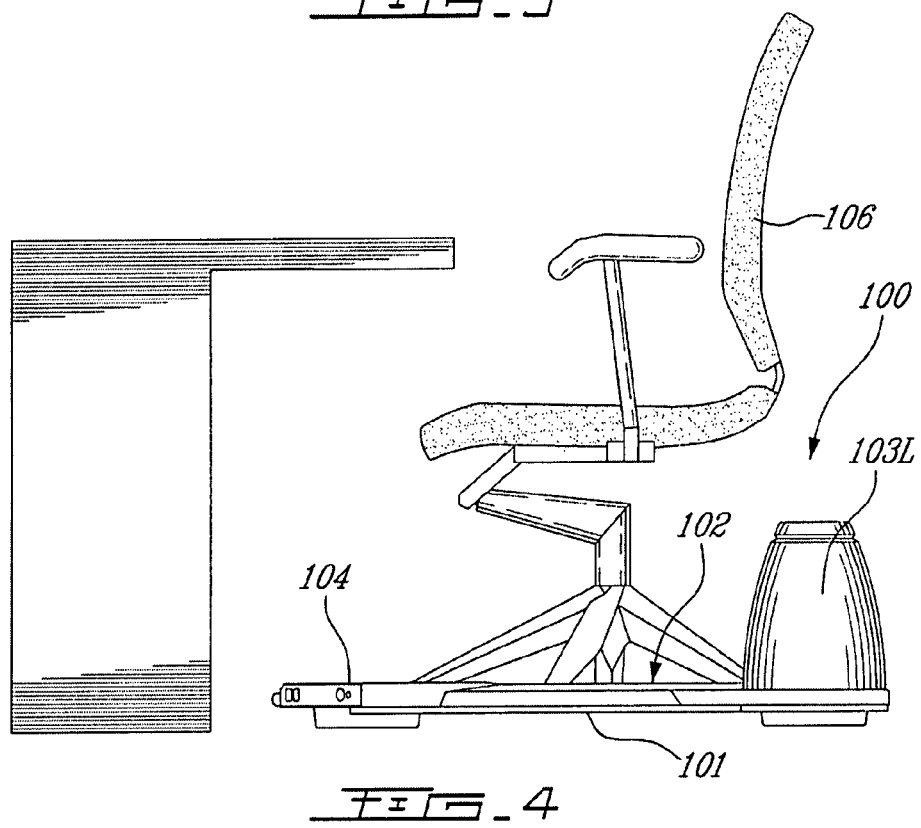
FIG_4

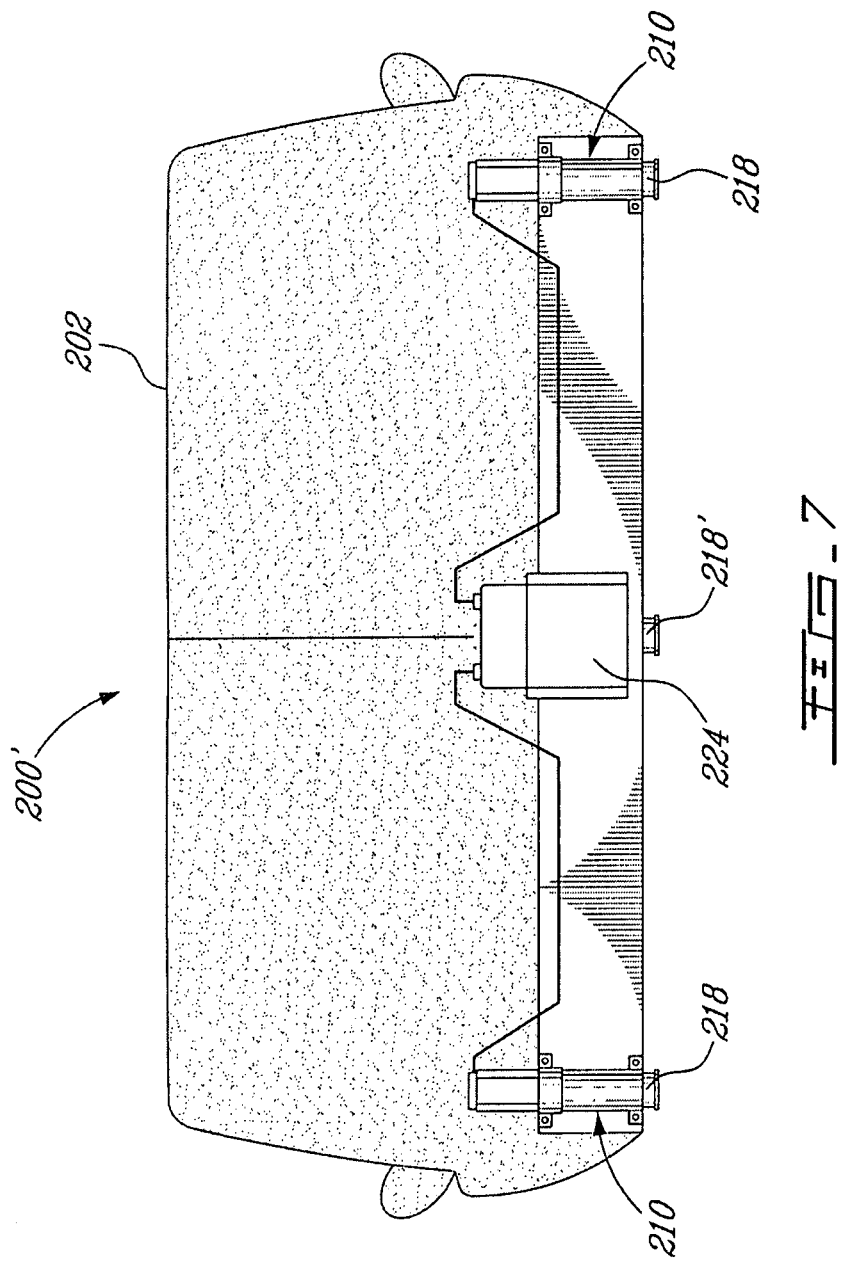

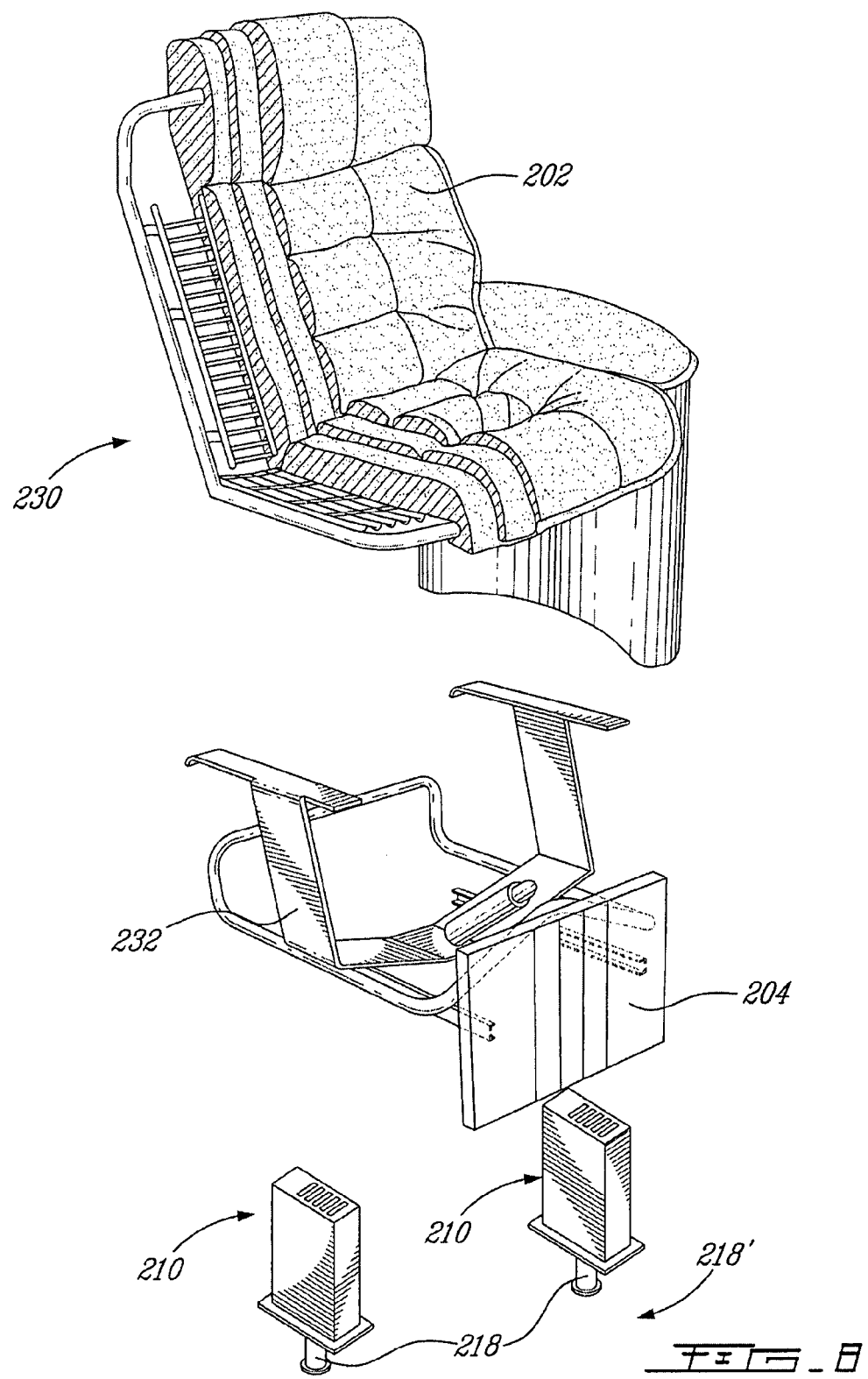
FIG_8

MOTION SIMULATOR AND METHOD

CROSS-REFERENCE TO RELATED APPLICATION

The present application relates to U.S. Pat. No. 6,662,560, granted on Dec. 16, 2003, to the present Applicant, and incorporated herewith by reference. The present application claims priority on U.S. provisional Application No. 60/469,824, filed on May 13, 2003 by the present Applicant.

BACKGROUND OF THE INVENTION

1. Field of the Invention

The present invention generally relates to motion simulators and, more particularly, to a structural configuration of a motion simulator receiving motion signals as a function of actions taking place in a video output.

2. Background Art

Home video games and home video systems have for years been limited to sight and sound interaction with a viewer. For instance, in response to the play of a gamer, video games will produce visual and sound response. In order to increase the sensation procured by video games, gamers often have recourse to arcades, wherein some video games are equipped with force feedback interfaces, by which a feel is added to the visual and sound response.

Due to the popularity of home video games and home video systems, force feedback interfaces have been developed and are readily available to provide the feel to viewers. For instance, BattleChair™ (as disclosed at www.BattleChair.com) provides a chair provided with a variety of speakers by which the sound output of a video output is transmitted to the chair and its occupant. More specifically, the BattleChair™ is hollow and has a subwoofer and three-way speakers that will cause the chair to vibrate as a function of the sound transmitted from the video output. Accordingly, the BattleChair™ provides a feel of the game to the gamer during play. Other embodiments of such chairs have been provided, such as the Intensor LX 350 Gaming Chair™ (www.3dsoundsurge.com/reviews/intensor350lx/intensor350lx.html). In arcades, some force feedback interfaces include gamer-receiving receptacles, wherein the gamer is seated. In order to fully procure the feel of the game to the gamer, gamer-receiving receptacles often provide support to the gamer's limbs, whereby the gamer is in a position of weightlessness.

Similar technologies have been brought to homes, but these types of force feedback interfaces are bulky and heavy. Owners of these types of interfaces must dedicate a fair amount of floor space—often a room—to have such interfaces at home. Such interfaces are not easily displaced and are hence impractical. Furthermore, it is contemplated to extend viewer-receiving receptacle interfaces to other uses, to increase their appeal to consumers. For instance, the platform for video games are often desktop personal computers, whereby uses of such interfaces relating to the desktop environment could represent enticing arguments for the purchasing of these interfaces.

SUMMARY OF INVENTION

It is an aim of the present invention to provide a novel motion simulator that provides movement sensations to a viewer in response to motion signals associated to a video output.

It is an aim of the present invention to provide a motion simulator adapted to be used in a context other than that of video output viewing.

It is a further aim of the present invention that the motion simulator be practical while providing a position of weightlessness to the viewer in viewing use.

Therefore, in accordance with the present invention, there is provided a motion simulator for transmitting motion with respect to a floor as a function of motion signals associated to a video output, comprising: a seating portion for accommodating a viewer viewing the video output; and at least two actuators, each of the actuators having a first member and a second member interrelated by a degree of freedom, each of the actuators having a degree of actuation connected to the seating portion for displacing the first member with respect to the second member along the degree of freedom as a function of actuation from the actuators in relation to the motion signals; wherein the first member of each of the actuators is secured to the seating portion, and the second member of each of the actuators comprises a leg supporting the motion simulator on the floor, whereby the seating portion is movable along at least two degrees of freedom as a function of actuation from the actuators.

Further in accordance with the present invention, there is provided a motion simulator comprising: an actuator base adapted to receive motion signals associated with a video output, and to transmit the motion signals in the form of degrees of actuation; a seating portion adapted to accommodate a viewer and being supported by the actuator base so as to be displaced as a function of the degrees of actuation; and at least one degree of freedom in the seating portion such that the seating portion is displaceable independently of the actuator base between a viewing position and a stand-by position in which access to the motion simulator is facilitated.

Still further in accordance with the present invention, there is provided an apparatus for transmitting movement to a chair as a function of motion signals associated to a video output, comprising: a base having actuators, the base being adapted to receive motion signals; and a support surface portion movably connected to the base so as to be displaced as a function of actuation from actuators of the base, the support surface portion having a support surface adapted to support a chair in which a viewer of the video output is sitting to impart movement to the viewer.

Still further in accordance with the present invention, there is provided a method for customizing a chair into a motion simulator supported on a floor, comprising the steps of: providing a chair; providing at least two linear actuators; and securing the linear actuators to an interior of the chair such that output shafts of the linear actuators support the chair on the floor; wherein the linear actuators are actuatable to displace the chair with respect to the floor.

Still further in accordance with the present invention, there is provided a motion simulator for transmitting motion with respect to a floor as a function of motion signals associated to a video output, comprising: a seating portion for accommodating a viewer viewing the video output and having a support portion so as to be supported on the floor; and an actuator having a first member and a second member interrelated by a degree of freedom, the actuator having a degree of actuation connected to the seating portion for displacing the first member with respect to the second member along the degree of freedom as a function of actuation from the actuator in relation to the motion signals; wherein the first member of the actuator is secured to the seating portion, and the second member of the actuator comprises a leg supporting the motion simulator on the floor, whereby the seating portion is supported by the support portion and the leg, and is movable along a degree of freedom as a function of actuation from the actuator.

BRIEF DESCRIPTION OF THE DRAWINGS

Having thus generally described the nature of the invention, reference will now be made to the accompanying drawings, showing by way of illustration a preferred embodiment thereof and in which:

FIG. 1 is a perspective view of a motion simulator constructed in accordance with a first embodiment of the present invention;

FIG. 2A is a left-side elevation view of the motion simulator in a working position;

FIG. 2B is a left-side elevation view of the motion simulator in a transition between the working position and a viewing position;

FIG. 2C is a left-side elevation view of the motion simulator in its viewing position;

FIG. 3 is a perspective view of a platform in accordance with a second embodiment of the present invention;

FIG. 4 is a left-side elevation view of the platform supporting a chair;

FIG. 7 is a schematic rear view of a couch customized into the motion simulator of the third embodiment of the present invention; and FIG. 8 is an exploded view, fragmented, of a chair customized into the motion simulator of the third embodiment of the present invention.

DESCRIPTION OF THE PREFERRED EMBODIMENTS

Figure 5:
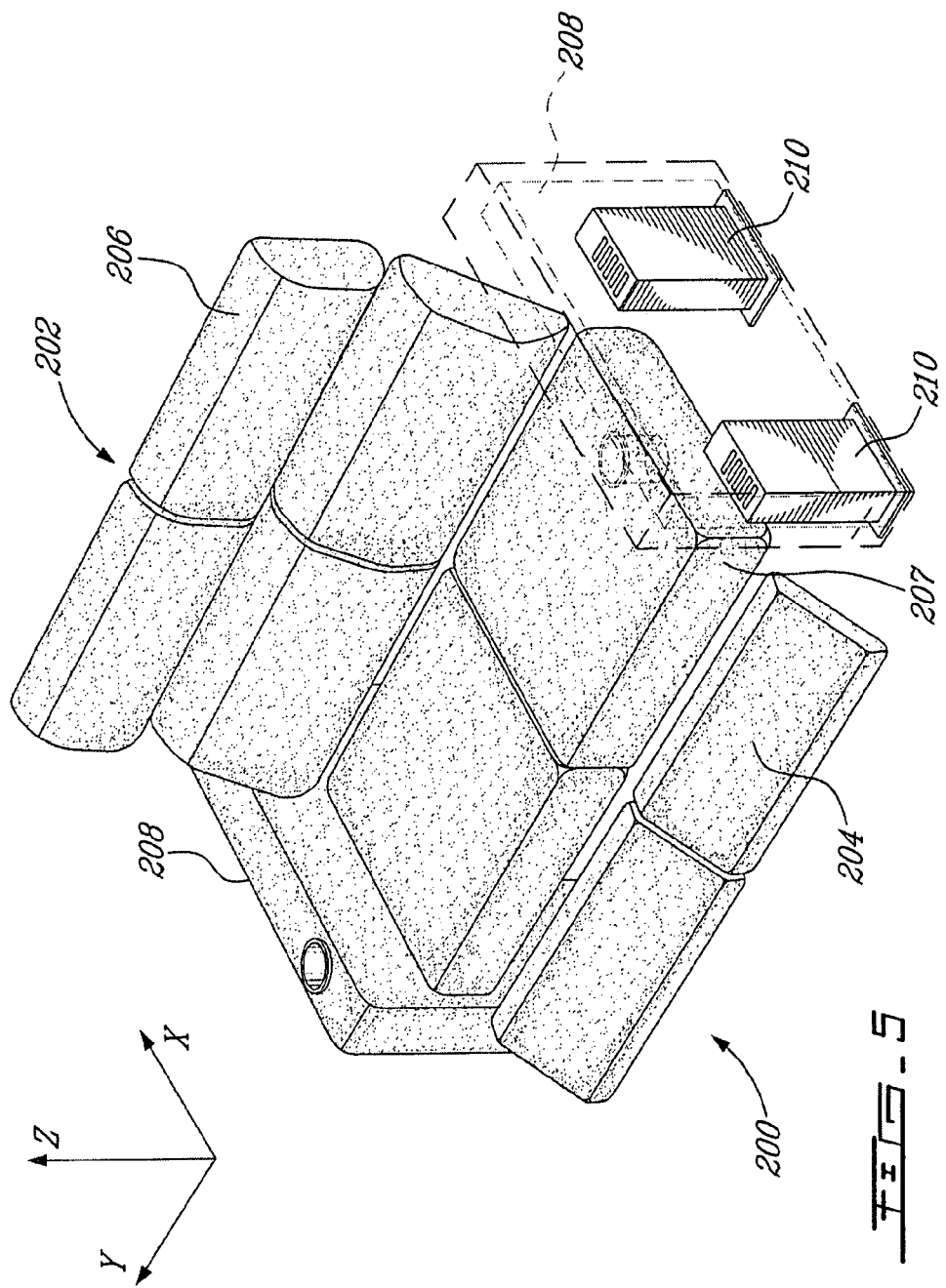
FIG. 5 is a perspective view of a motion simulator in accordance with third embodiment of the present invention.

Referring to the drawings and, more particularly, to FIG. 5 a motion simulator in accordance with a preferred embodiment of the present invention is generally shown at 200. The motion simulator 200 has a seating portion 202 accommodating viewers of a video output. The motion simulator 200 of FIG. 5 is sized so as to receive two viewers, but may be smaller or larger.

It is pointed out that the motion simulators described hereinbelow, such as the motion simulator 200, are associated to a video output, which may for instance be a motion picture, a television show, or a video game. In such instances, the motion simulators of the present invention receive motion signals associated to the video output. For instance, the audio portion of the video output is well suited to be associated with the motion signals, and hence the motions of the motion simulators of the present invention.

The seating portion 202 has a footrest 204 and a backrest 206 at opposed ends of a seat 207, which are displaceable in a similar fashion to recliner chairs, such that the occupants of the motion simulator 200 may adopt viewing positions in which, for instance, the legs of the occupants are supported.

The seating portion 202 has armrests 208 at the sides of the seat 207. In the embodiment of FIG. 5, the seat 207 and the armrests 208 define the structure of the seating portion 202, and support the footrest 204 and the backrest 206, including mechanisms that enable the displacement of the footrest 204 and the backrest 206.

The armrests 208 each define an inner cavity that houses actuators 210. More specifically, in FIG. 5, one of the armrests 208 has been fragmented to illustrate a pair of actuators 210. One of the actuators 210 is adjacent to a front end of the motion simulator 200, and the other of the actuators 210 is adjacent to a rear end of the motion simulator 200.

Figure 6:
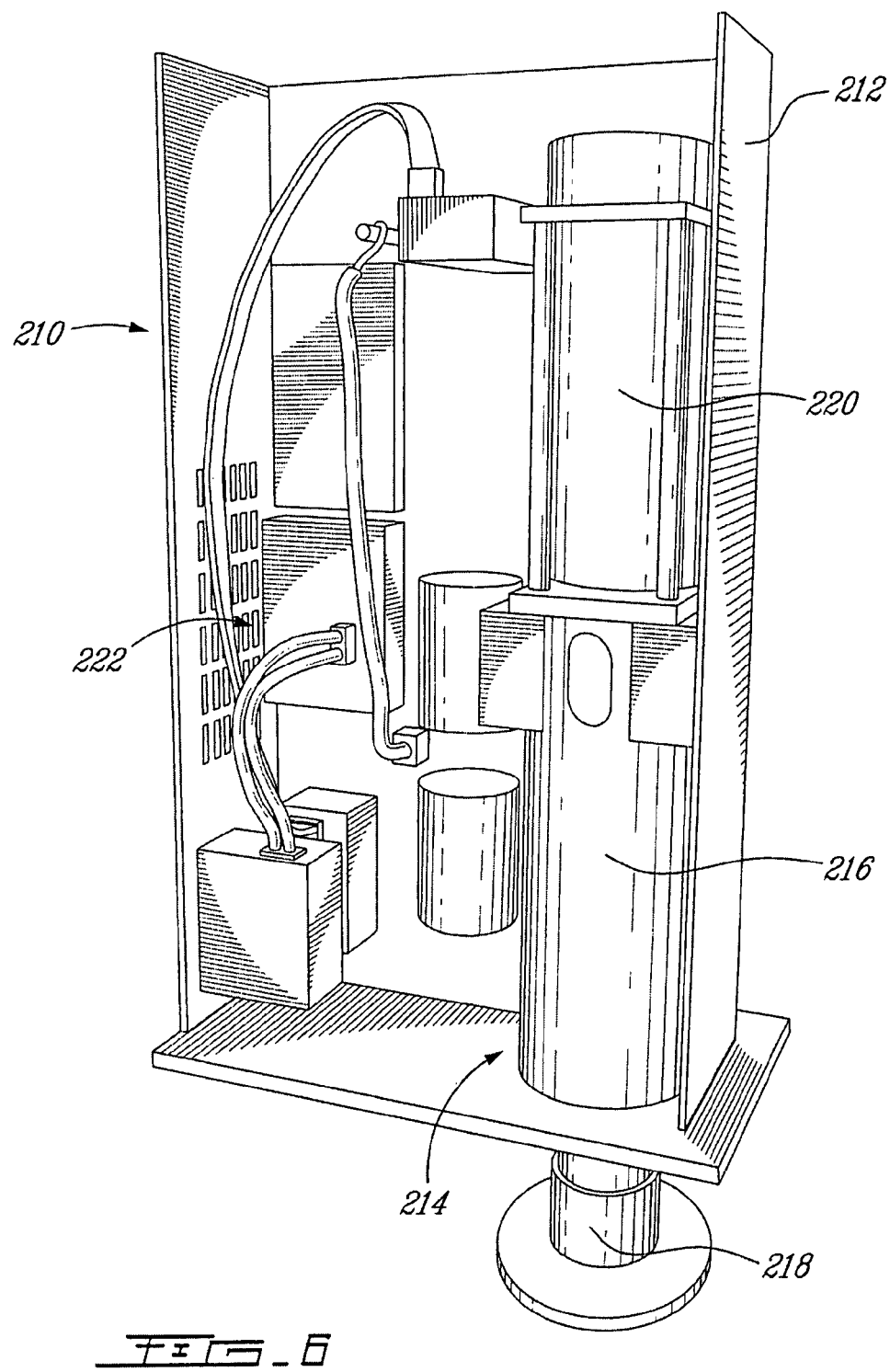
FIG. 6 is a perspective view of an actuator for the motion simulator of the third embodiment of the present invention.

Referring to FIG. 6, one of the actuators 210 in accordance with the preferred embodiment of the present invention is shown in greater detail. More specifically, the actuator 210 has a casing 212 (with walls thereof removed for illustrative purposes) enclosing part of a linear actuator 214. The linear actuator 214 has a housing 216 that holds an output shaft 218. As is known for linear actuators, there is one translational degree of freedom between the housing 216 and the output shaft 218.

A degree of actuation is provided so as to actuate the degree of freedom between the housing 216 and the output shaft 218. For instance, the degree of actuation may be in the form of a motor, of by way of a compressed medium. In a preferred embodiment of the present invention, it is contemplated to provide the actuator 210 with a motor 220 (e.g., brushless AC motor), as electric power is more readily available in households (i.e., where use of the motion simulator 200 is contemplated).

The casing 212 of the actuator 210 may enclose other components generally illustrated at 222, such as electronic components, signal interpreters/controllers, transformers, and the like, for the actuator 210 to receive motion signals from a motion signal provider, and to actuate the degree of freedom as a function of the motion signal.

According to the preferred embodiment of the present invention, the actuator 210 is positioned within the seating portion 202 such that the output shaft 218 faces toward the ground, and thus defines a leg of the motion simulator 200. Accordingly, it is the output shaft 218 that remains stationary with respect to the ground, while the remainder of the actuator 210 moves with seating portion as a response to motion signals.

Therefore, the legs of the motion simulator 200 that are defined by the output shafts 218 are separated from one another—they are not interconnected by a base—and are generally normal to the ground. The motion simulator 200 has its motorized components concealed, save from the output shafts 218 which look like typical legs of a couch. Accordingly, the motion simulator 200 may appear to be a typical couch, yet is capable of various motions simulating a video output. As will be discussed hereinafter, the motion simulator 200 of the preferred embodiment may thus be customized from existing couches, so as to lower the costs of production of the motion simulator 200.

The motion simulator 200 of FIG. 5 has four of the actuator 210, two of which are visible. Accordingly, the seating portion 202 of the motion simulator 200 of FIG. 5 may be displaceable along four degrees of freedom. Referring to the coordinate systems, the seating portion 202 may move in translation along the Z-axis, and in rotation along the three axes, as a result of the combination of actuation from the four actuators 210.

It is contemplated to provide at least two of the actuators 210 to the motion simulator 200 in accordance with the preferred embodiment of the present invention. For instance, the motion simulator 200 may be supported only by a pair of the output shafts 218, with the output shafts 218 having horizontal feet (not shown) at bottom ends thereof. In such a case, the two output shafts 218 are preferably aligned along the Y-axis, with the seating portion 202 being displaceable in translation along the Z-axis, and rotatable about the X-axis.

Referring to FIG. 7, the motion simulator 200' is shown having three legs. The two lateral legs are output shafts 218, and are adjacent to a rear edge of the seating portion 202. On the other hand, a third leg 218' is centrally positioned along a front edge of the seating portion 202, and may either be a third one of the actuators 210, or simply a support leg. In such a case, the support leg is either connected to the seating portion by a joint (e.g., ball and socket, universal joint or the like), or may be without any joint. A controller is shown at 224, connected to the actuators 210 to provide motion signals to the actuators 210. In the event that the motion simulator 200' has three of the actuators 210, the seating portion 202 is displaceable along three degrees of freedom with respect to the ground.

As mentioned previously, the motion simulator configuration of the preferred embodiment of the present invention, is convenient in that actuators 210 may be installed to typical couches, with the actuators 210 being generally concealed save for the output shafts 218 which act as legs for the motion simulator. Moreover, no base is required whereby the motion simulator in accordance with the preferred embodiment of the present invention represents a cost effective solution.

It is also contemplated to provide the motion simulator with a single actuator 210, in the above described configuration. For instance, the motion simulator 200' of FIG. 7 may be provided with a centrally positioned actuator, at the position illustrated by 218', whereas the actuators represented by the output shafts 218 may be replaced by stationary support legs, or the like. In such case, the seating portion of the motion simulator would be displaceable in one degree of freedom.

Referring to FIG. 8, a typical recliner chair (e.g., or non-recliner chair) is illustrated at 230, with portions thereof removed to illustrate its configuration. A pair of the actuators 210 are illustrated in position for being secured to the recliner chair 230, so as to customize the chair 230 into a motion simulator in accordance with the preferred embodiment of the present invention. A support leg 218' is to be secured to a frame 232 of the footrest mechanism.

Referring to FIG. 1, a motion simulator in accordance with another embodiment of the present invention is generally shown at 10. The motion simulator 10 has a base portion 20 and a seating portion 30. The base portion 20 displaces the seating portion 30 as a function of motion signals associated with a video output. The base portion 20 is thus connected to a game console, a controller or a peripheral thereof and receives motion signals related to the video output. The base portion 20 converts these motion signals to an actuation of the seating portion 30, to procure a feel of the video output to a viewer (e.g., gamer) accommodated by the motion simulator 10.

In the first embodiment of the present invention, the base portion 20 has a front central actuator 21, a rear left actuator 22L and a rear right actuator 22R. The actuators 21, 22L and 22R are interconnected by a frame 23 so as to be upstanding and in a triangular configuration. Each of the actuators 21, 22L and 22R has an output arm 24. The output arms 24 are the interfaces of the base portion 20 with the seating portion 30. Hence, the output arms 24 transmit degrees of actuation and/or degrees of freedom to the seating portion 30. For instance, the actuators 21, 22L and 22R may be of the type described in U.S. Pat. No. 6,662,560, by the present Applicant.

Referring to FIG. 1, the seating portion 30 has a frame consisting of a left structural member 31L and a right structural member 31R. The structural members 31L and 31R are interconnected by transverse support members, one of which is shown at 32. Rear-ends of the structural members 31L and 31R are each provided with a respective post. More specifically, the structural member 31L has left post 33L (FIGS. 2A to 2C), whereas the structural member 31R has right post 33R. The posts 33L and 33R are respectively connected at bottom ends thereof to the output arms 24 of the rear left actuator 22L and the rear right actuator 22R. The transverse member 32 is secured to the output arm 24 of the front central actuator 21. Therefore, actuation/degrees of freedom of the output arms 24 will be transmitted from the base portion 20 the seating portion 30 via the transverse member 32 and the posts 33L and 33R.

The seating portion 30 has a seat 34, including a backrest 35 having a headrest portion 36. The backrest 35 is preferably pivotable with respect to a remainder of the seat 34 to provide adjustment to the sitting position of a user person. In FIG. 1, the seat 34 is generally positioned toward a rear end of the structural members 31L and 31R, hereinafter "the game-playing position." Left and right legs 37L and 37R, respectively, are pivotally mounted to front ends of the structural members 31L and 31R, respectively. The left leg 37L and the right leg 37R cooperate to support footrest 38. In FIG. 1, the left leg 37L and the right leg 37R are shown pivoted such that the footrest 38 is in a foot-resting position. A translational degree of freedom is provided between the structural members 31L and 31R and the footrest 38 so as to adjust the distance between the footrest 38 in its foot-resting position and the seat 34, as a function of the size of the viewer taking place in the motion simulator 10, in the viewing position of the seat 34.

The seating portion 30 further has a left armrest 39L and a right armrest 39R. The left armrest 39L and the right armrest 39R are respectively mounted to upper ends of the left post 33L and the right post 33R so as to pivot with respect to a longitudinal axis of their respective posts. Hence, either one or both of the armrest 39L and 39R may be pivoted away from the seat 34 to allow access thereto. The left armrest 39L and right armrest 39R have an arcuate shape. In FIG. 1, the left armrest 39L and the right armrest 39R are shown in an arm-resting position, wherein the armrests 39L and 39R substantially surround the seat 34 so as to enclose the viewer sitting in the motion simulator 10. Although in FIG. 1 the armrests 39L and 39R are shown having a space therebetween when in their arm-resting position, it is contemplated to shape the armrests 39L and 39R for same to meet when in the arm-resting position. The armrests 39L and 39R have a smooth top horizontal surface upon which the person sitting in the motion simulator 10 may rest his arms or upon which a peripheral can be received (e.g., joystick, keyboard or other similar implements). The contemplated embodiment in which the armrests 39L and 39R meet in the arm-resting position is well suited to receive a keyboard.

Referring to FIGS. 2A to 2C, the seat 34 is operatingly mounted to the structural members 31L and 31R so as to be displaceable thereupon. In FIG. 2C, the seat 34 is in its game-playing position, as described and shown previously in FIG. 1. As also mentioned previously, in this configuration, the footrest 38 is in its foot-resting position, whereas the armrests 39L and 39R are in their arm-resting position.

FIG. 2A illustrates a working position (i.e., stand-by position) of the motion simulator 10. In this configuration, the seat 34 is brought forward generally above the front central actuator 21 of the base portion 20 so as to bring the seat 34 adjacent to a working surface 50. In order to allow the seat 34 to be displaced from the viewing position to the working position (i.e., stand-by position), the armrests 39L and 39R must be pivoted away from their arm-resting position, whereas the footrest 38, including the legs 37L and 37R, must be pivoted inwardly so as to be accommodated between the structural members 31L and 31R. In this position, the footrest 38 does not impede the legs of a person sitting in the motion simulator 10 and using the working surface 50. The person sitting in this position of the motion simulator 10 has a normal sitting stance, appropriate to work on the working surface 50.

FIG. 2B illustrates the transition of the motion simulator 10 between the viewing position (FIG. 2C) and the working position (FIG. 24). In FIG. 2B, the armrests 39L and 39R are being pivoted from or to the arm-resting position of FIG. 2C.

The above described viewing position and working position allow for the motion simulator 10 to be used both for viewing the video output (e.g., playing games) or for working. This is convenient. In video games, for instance, the game console is frequently a personal computer, that is not limited to uses as a video-game console. Accordingly, the game station consisting of the motion simulator 10, the personal computer and a support table therefor, can readily be turned into a PC work station.

In the embodiment illustrated in FIG. 1, the seating portion 30 is interconnected to the base portion 20 at three locations, namely at the output arms 24 of the actuators 21, 22L and 22R. All three of the actuators 21, 22L and 22R can be actuated to impart movements to the seating portion 30. It is also possible to simply provide a three degree-of-freedom joint (e.g., ball joint) between the front central actuator 21 and the transverse member 32, in which case the seating portion 30 would be displaced by actuation from the actuators 22L and 22R.

Referring to FIG. 3, a second embodiment of the present invention is shown consisting of a platform 100. The platform 100 is connected to a controller or another source of motion signals associated with a video output so as to receive motion signals related to video action taking place in the video output. The platform 100 converts these motion signals to an actuation of a chair received thereon.

More specifically, the platform 100 has a base 101 and a support surface portion 102. The support surface portion 102 is the displaceable member of the platform 100. The base 101 includes rear actuators 103L and 103R which receive the input signals related to the video action. A footrest surface 104 of the base 101 is provided at a front end of the platform 100. A handle 105 is provided centrally in the footrest surface 104, by which the platform 100 may be carried. The actuators 103L and 103R are operatively connected to the support surface portion 102 so as to transmit degrees of actuation thereto as a function of the motion signals.

Referring to FIGS. 3 and 4, the support surface portion 102 is adapted to support a chair thereon. The support surface portion 102 may be modeled so that the chair 106 is matingly received thereon. As an example, in the embodiment of FIGS. 3 and 4, the support surface portion 102 is configured to receive a five-legged chair 106. Additional fasteners (not shown) may be used to ensure that the chair 106 remains anchored to the support surface portion 102. A front end of the support surface portion 102 (i.e., corresponding to a front end of the platform 100) is supported by a pivot, of the type providing three rotational degrees of freedom (e.g., a ball joint connection). A rear end of the support surface portion 102 is connected to the actuators 103L and 103R, so as to receive the degrees of actuation therefrom. Accordingly, a user person sitting in the chair 106 will be subjected to the degrees of actuation of the actuators 103L and 103R, to obtain a feel of the video output. It is contemplated to provide additional actuators, such as a front central one, to increase the amplitude of the movements of the platform 100.

The platform 100 of the second embodiment is advantageous in that it may be put away upon being used. The handle 105 is conveniently provided to facilitate the handling of the platform 100, and the chair 106 is separable from the platform 100, thereby lessening the load represented by the platform 100.

We claim:

1. A motion simulator for transmitting motion with respect to a floor as a function of motion signals associated to a video output, comprising:
    a seating portion for accommodating a viewer viewing the video output, the seating portion comprising at least a seat, a backrest and armrests on opposite sides of the seat, the armrests each defining an inner cavity; and
    at least two actuators, each of the actuators having a housing and an output shaft interrelated by a degree of freedom, each of the actuators having a motor in the housing fixed to the seating portion without any degree of freedom between the motor and the seating portion, and a free end of the output shaft oriented toward the floor for displacing the output shaft with respect to the housing along the degree of freedom as a function of actuation from the actuators in relation to the motion signals such that the free end of the output shaft pushes against the floor to lift the seating portion;
    wherein the housing and the motor of at least two of the actuators are secured to the seating portion and are received and fully housed in the inner cavity of a respective one of the armrests, and the free end of each of the output shafts of the actuators permanently support the motion simulator directly on the floor with the free ends of the output shafts not being connected to one another, whereby the seating portion is movable along at least two degrees of freedom as a function of actuation from the actuators.

2. The motion simulator according to claim 1, wherein an upper end of the support leg is connected to the seating portion by a joint having at least two degrees of freedom.

3. The motion simulator according to claim 1, wherein the two actuators are generally normal to the floor, and are each positioned at a respective rear end corner of the motion simulator, with the support leg being positioned adjacent to a front end of the motion simulator.

4. The motion simulator according to claim 1, wherein the motion simulator has three of the actuators, whereby the motion simulator is supported by three of the housing, and the seating portion is movable along three degrees of freedom as a function of actuation from the actuators.

5. The motion simulator according to claim 4, wherein the actuators are generally normal to the floor, with two of the actuators each positioned at a respective rear end corner of the motion simulator, and a third of the actuators being positioned adjacent to a front end of the motion simulator.

6. The motion simulator according to claim 1, wherein the seating portion has a footrest displaceable between a retracted position, wherein the footrest is generally perpendicular to the floor so as not to impede with the legs of the viewer, and a support position, wherein the foot rest is pivoted away from the retracted portion so as to support the legs of the viewer.

7. The motion simulator according to claim 1, further comprising a support leg, whereby the motion simulator is supported on the floor by the output shafts of the actuators and the support leg.

8. A motion simulator for transmitting motion with respect to a floor as a function of motion signals associated to a video output, comprising:
    a seating portion for accommodating a viewer viewing the video output and having a support portion so as to be supported on the floor, the seating portion comprising at least a seat, a backrest and armrests on opposite sides of the seat, the armrests each defining an inner cavity; and an actuator having a first member and a second member interrelated by a degree of freedom, the actuator having a motor immovably mounted to the seating portion without any degree of freedom between the motor and the seating portion, with a free end of the second member oriented toward the floor for displacing the second member with respect to the first member along the degree of freedom as a function of actuation from the actuator in relation to the motion signals such that the free end of the second member pushes against the floor;

wherein the first member and the motor of the actuator are secured to the seating portion and are received and fully housed in the inner cavity of a respective one of the armrests, and the second member of the actuator comprises a leg permanently supporting the motion simulator on the floor with the free end of each of the legs not being connected to one another on the floor, whereby the seating portion is supported by the support portion and the leg and is movable along a degree of freedom as a function of actuation from the actuator.

9. The motion simulator according to claim 7, wherein the motion simulator has four of the actuators, with the housing and the motor of two of the actuators being received and housed in the inner cavity of a first one of the armrests, and with the housing and the motor of two other ones of the actuators being received and housed in the inner cavity of a second one of the armrests.

* * * * *